Figure 1:
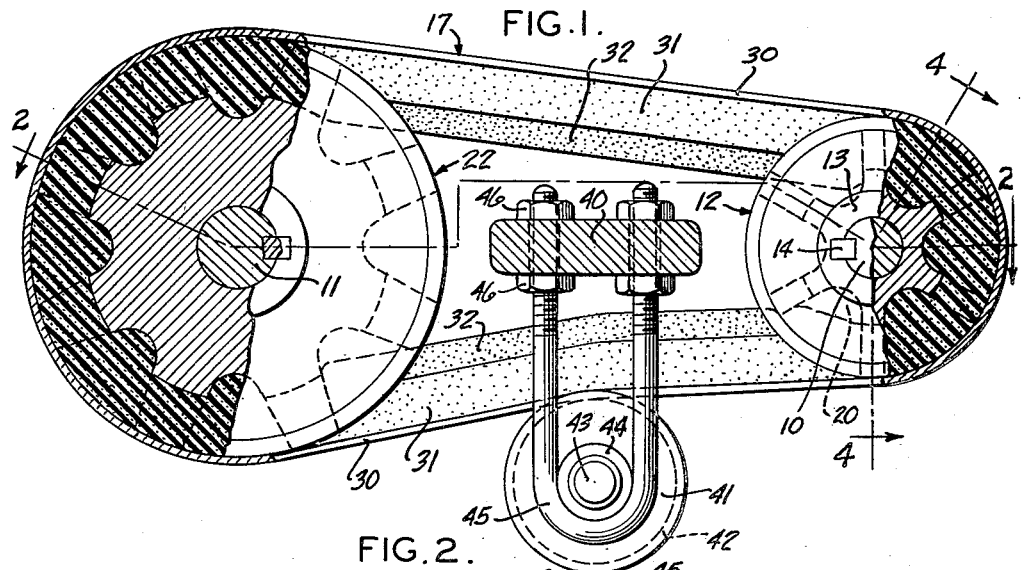

Dec. 19, 1950  C. I. PLACE  2,534,679

BELT DRIVE ASSEMBLY

Filed July 21, 1945

INVENTOR
CHARLES I. PLACE

BY
Robert B. Terry
ATTORNEY

Patented Dec. 19, 1950

2,534,679

UNITED STATES PATENT OFFICE 2,534,679

BELT DRIVE ASSEMBLY

Charles I. Place, New Milford, Conn.

Application July 21, 1945, Serial No. 606,325

7 Claims. (Cl. 74—229)

This invention relates to improvements in belt drive assemblies, and more particularly to improved belting and pulley constructions for use in power transmission assemblies of the types employing paired driving sprockets or pulleys and a flexible endless belt or band by which the rotary elements are operatively connected.

It is well known among those familiar with various types of flexible driving connections that many difficulties prevail in their operation. Flat face pulleys and flat belt drives are notoriously subject to slippage, and without excessive belt tension, afford for many types of service, and inadequate frictional driving area. The V-type belt drives are dependent largely upon the frictional drag of a considerable area of contact of belt with pulleys. Drives of so-called silent-chain type operate satisfactorily for considerable periods, but are expensive to manufacture in that usually both the chain and sprockets must be relatively accurately machined. Accordingly, the present improvements objectively result in an improved power transmission assembly including pulleys or sprocket-like wheels for the purpose of attaining a distinguishable and improved gripping action between the pulleys and belting, in comparison with that commonly attained by the usual V-belts and sheaves; further, the present improvements are characterized by a considerably lower pulley manufacturing cost than the prevalent silent chain and machined pulley driving arrangements. Further important objectives of the invention may be briefly stated as a more positive drive, and an almost complete elimination of slippage.

A still further objective attainment of the present developments consists in an arrangement of pulleys and belting such as to provide a temporary positive driving interlock between the belting and the pulleys, the operative interrelation of these elements resembling in some degree the positive connection prevailing between chain and sprockets, but eliminating their disadvantages.

Still a further objective of importance, is attained in an arrangement conducing to a better internal cooling of the belting stock as provided for by alternate compression and expansion of a highly compressible, somewhat porous belting material in such manner as to tend frequently to aerate the stock of the belting and thus to promote dissipation of its heat to the pulleys and the ambient air.

An additional and important object is attained in the provision of an improved pulley construction providing a readily releasable interlocking anchorage with suitable types of belting, and an arrangement such that a highly compressible belting is alternately expanded in each of two different directions in a more or less regular cycle, in the course of its movement over the pulleys.

Yet another object making for reduction of pulley cost, is an improved pulley design such that these elements may be formed by casting and without necessarily requiring any of the more usual expensive machining or grinding operations.

Figure 2:
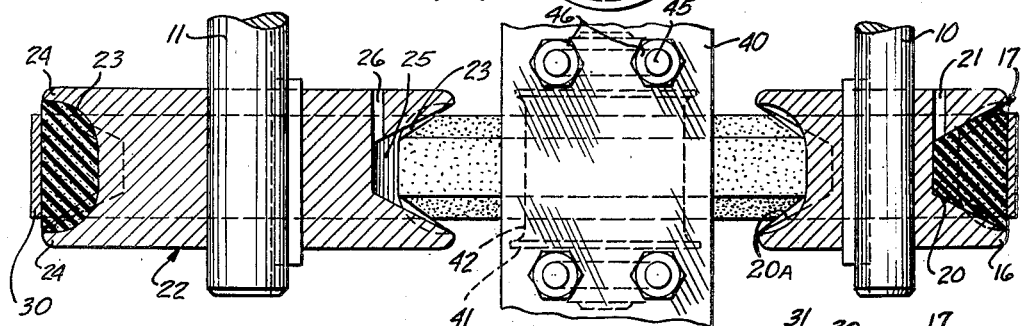
Figure 3:
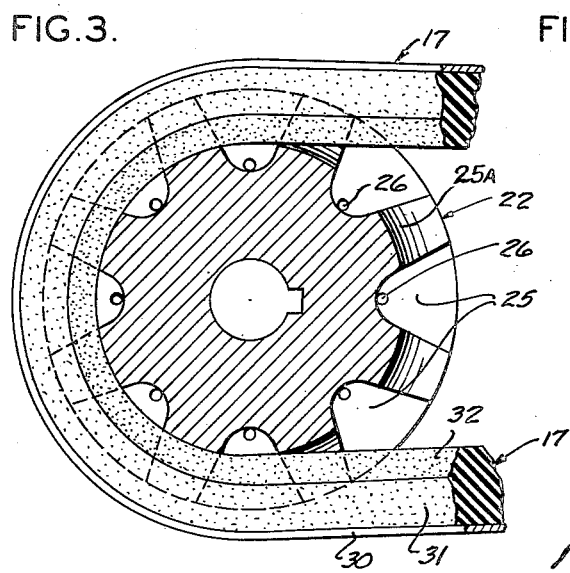
Figure 4:
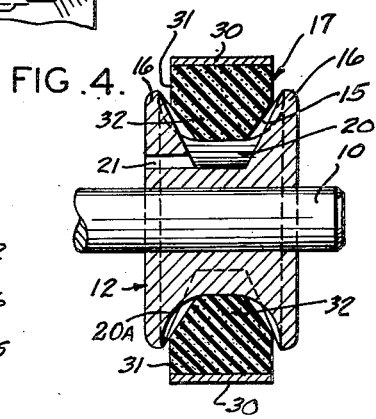

The foregoing and numerous other objects will more clearly appear from the following detailed description of a presently preferred embodiment of the invention, particularly when considered in connection with the accompanying drawing, in which:

Fig. 1 is a sectional elevation of a transmission including a pair of pulleys or sprockets interconnected by an endless belt, and showing one form of idler for maintaining a moderate belt tension, portions of the pulleys being broken away and shown in section in order better to reveal the internal construction of the pulleys and the relation of the belting thereto, the sectional portions of Fig. 1 being taken as viewed along planes normal to the pulley axes or shafts;

Fig. 2 is a sectional view of the assembly of Fig. 1, as taken along staggered planes indicated by line 2—2 of Fig. 1;

Fig. 3 is a sectional view of one of the pulleys, taken normal to its axis, and showing a portion of the belting as same would appear when riding loosely in the pulley, and under less than usual operating tension, and Fig. 4 is a sectional view as taken along line 4—4 of Fig. 1, and showing a portion of the belting in section as same would appear in relation to the pulley when under less than operating tension.

Referring now by characters of reference to the drawing, the assembly shown includes a pair of shafts 10 and 11, of which 10 may be selected as the driving shaft and 11 a driven shaft, solely by way of example and convenience of further description. The pulleys will obviously be employed in one or more pairs, a single such pair having been selected for illustration. The arrangement may obviously be employed in multiple belt arrangements, in which each pulley may carry any desired plurality of the preferably endless belting units.

Since the pulleys but for usual diametral differences, are or may be the same, an extended description of one will suffice. Considering now the pulley 12, this comprises a hub portion 13 and suitable means for locking the hub to the shaft such as a key 14. That portion beyond the hub may be referred to as a web or rim portion, and by preference in the present embodiment, is of a substantial width or axial extent as is perhaps best shown by Figs. 2 and 4. The rim portion of each of the pulleys shown is characterized by a peripheral channel, belt seat or groove 15. This is by preference, as will appear from Fig. 4, of a curvilinear cross section and may be substantially arcuate. The channel terminates outwardly at each side of the pulley, in a pair of flange portions 16. According to preference and in the example shown, the channel 15 is of a depth approximating one-half the depth of the belting in its released or unstressed condition, as will appear from Fig. 4. Preferably also the greatest width of the channel 15 between its flanges 16, is considerably in excess of the unstressed width of the pulley-engaging portion of the belting. A preferred form of the belting will later be described in more detail, but is now indicated generally at 17.

Angularly spaced about the pulley 12 are a plurality or series of top-open pockets, recesses, or wells 20. It will be noted that each of the wells or pockets 20 is entirely separate from the others, being separated by intervening wider, but more shallow pockets 20A as will appear in Figs. 2 and 4, the upper portions of the two sets of pockets opening into and forming in part, the peripheral channel 15. By preference but not necessarily, each of the wells 20 is substantially fully closed except for its top opening, although if desired, each such pocket may be provided with an air escape passage 21, the purpose of which will later be described. It is a preference that each of the wells 20 be of converging section from its top inwardly toward the axis of the pulley, these wells being conveniently formed each of a trapezoidal section as shown for example, by Figs. 2 and 4, having reference to the shaping of these pockets when considered in radial planes parallel to and including the axis of the pulley. Considering sections at a right angle to the first mentioned planes, the pockets 20 are each formed to present a rounded uniformly concave bottom as will appear from Fig. 3. It is a considerable preference also that the walls or pockets 20 be more or less completely laterally confined, i. e., closed except at the top or perhaps by a lesser bottom opening as noted. It should be noted in connection with the description of the pulleys, that when utilizing a highly compressible endless driving element such as the belting to be described as particularly serviceable with this type of pulley, that neither the channels 15 nor the pockets 20, 20A need be at all accurately machined, in fact, for most services need not be machined at all.

Since as noted, the construction of the companion pulley indicated generally at 22 may be identical with that of the pulley 12, except for diameter and number of pockets, the foregoing description of pulley 12 will be understood as equally applicable to pulley 22. In the latter the continuous channel is indicated at 23, the side flanges at 24 and the deeper belt pockets or recesses shown at 25 with intervening wider and more shallow pockets 25A. Air discharge passages are indicated in pulley 22, at 26.

The novel construction of pulleys heretofore described is, as formerly noted, particularly applicable for use with a novel form of belting, preferably employed as an endless belt, built up and cured to any of the relatively exact desired lengths, although obviously susceptible of usage by various end fastening expedients applied to a suitable length of stock belting.

The belting includes at least two major elements or component parts, the outermost of which is a substantially non-stretchable portion herein shown in the form of an endless flat metal band 30. This may be formed of a strip having its ends butt-welded or otherwise secured so as to present a substantially uniform thickness throughout. Alternately, other types of substantially stretchless material, for example, a braided or woven wire stock (not shown) may be employed as the element 30.

Securely bonded to the stretchless band 30 is a body of a highly compressible, preferably finely and profusely cellular rubber or rubber-like stock. The part of this stock indicated at 31 and immediately beneath the band 30 is of a normal even width therewith, but inwardly of the portion 31 is a trapezoidal portion 32. It will be noticed that the latter is of diminishing section proceeding depthwise of the belt, and that the slope of its sides is somewhat less, relative to the band 30, than the slope of the sides of the trapezoidal portions of pockets 20, heretofore described.

It is a preference further so to determine the depth and width of the belting 17 that the compressible layer 31, 32 thereof will, under operating tension, and considering the excess width of the channel 15, about snugly occupy the channel in the manner indicated at the left hand side of Fig. 2 of the present drawing. The nature of the stock of which the layer 31, 32 is formed, is by preference such that it may be easily compressed under a moderate belt tension to a depth of one-half of its original depth or thickness, and in any case should have a depthwise resilience permitting its easy compression to reduce its original unstressed thickness by at least one-third.

It is contemplated to realize the advantages of the relatively highly compressible belting stock by utilizing the drive with the belting under a moderate tension. While obviously any of the several types of belt tensioning means which operate by direct adjusted displacement of either of the shafts will serve this purpose, there is shown for completeness, a belt tensioning arrangement including a stationary bar 40, and an idler pulley 41 provided with a shallow peripheral groove 42, the width of which is such as to accommodate the stretchless band 30 of the belting. An idler pulley shaft 43 is cradled through its bearings 44 in a pair of U-bolts 45, each of the members 45 being provided with paired nuts 46 enabling a distance adjustment of pulley 41 toward and away from the belt 17 for regulation of tension.

The operation and function of the several elements during operation of the assembly are thought to have been fully apparent from the foregoing description of parts, but it may be noted for completeness that with the endless belt 17 riding loosely in the pulley channels 15 and 23, as when the idler 41 is released, the relation of the belting to the pulley grooves, pulley channels and pockets will be about as illustrated in Fig. 4 as to the driving pulley, and as shown by Fig. 3 in respect to the driven pulley. It will appear that in this relation the belting overrides the several pockets 20 and 25 and does not appreciably interengage any thereof. Assuming now the belt to be tensioned, it will appear that the belting will assume a relation to the pulleys such that, for example, one-half the length of the channel portion of each pulley will be fully occupied by the belting, and that the belting will thus "flow" in these regions laterally of its normal limits so as substantially fully to occupy the channels over the belt-engaged angle of each pulley. Furthermore, because of the depthwise compressibility of the stock constituting portions 31 and 32, immediately the belting encounters the several deeper pockets, the stock, particularly of portion 32 will at once expand depthwise inwardly of the pulley and into the several pockets as it engages them. There is thus provided by the belting portions penetrating the deeper pockets, a positive interfitting relation between belting and pulleys, which results in a condition comparable to that which obtains in chain and sprocket drives of certain types. The belt action in overriding the pulleys is however exceedingly quiet, and because of the high compressibility of the driving layer of the belt, a substantial pulley gripping effect is realized. Any tendency of the compressible belt portion to be cushioned out of the several pockets due to entrapment of air therein, is assured against by the provision of the air escape passages 21.

From the foregoing it will now have appeared that, as a given zone of the belting encounters and traverses any given pulley pocket such as 20 or 25, the compressible layer of the belting is first expanded depthwise in filling the pockets and in proceeding just beyond any given deep pocket virtually the same body of stock is caused by its own resilience, to expand laterally into the wide pockets to occupy the adjacent conformity of the channel portion of the pulley. In this manner the belting is caused to flex in each of two directions mutually at right angles. It results from this action that the porous or highly cellular stock of the belting in turn absorbs an appreciable volume of air and later upon compression discharges this volume of air, thus resulting in a continuing aerating effect, and in spite of extreme flexure of the belt, assures that under any ordinary rated load, the belting stock will remain desirably cool.

Considering the action of a given zone of the layer 32 as it encounters successive pockets, it is now obviously subjected to an alternate depthwise compression and expansion of this portion of the stock as it successively flows into, out of, and then into succeeding pockets.

It is appreciated and contemplated that because of current developments in the fields of thermoplastic and thermosetting materials other than rubber, synthetic rubber or the like, there are or may be available products of this order suitable to constitute the compressive layer of the belt; accordingly, the stated preference for a rubber or rubber-like material in such layer should be regarded as expressive of general characteristics desired, rather than restrictive as to materials.

It will have appeared that the belting as described possesses unusual flexing properties, even though employed with pulleys differing somewhat from those shown, and that the converse is equally true. It is felt, however, that the present advanced designs of both belting and pulleys will best provide in a combination, a structure admirably suited for a low cost power drive of the general type referred to, and will fully attain each of the several objects expressed and implied in the foregoing description. Since numerous changes may be made, the detail or description is to be understood solely in an informative and illustrative sense, and not in any manner to limit the full intended scope of the claims hereunto appended.

I claim as my invention:

1. A power transmission pulley for use in pairs with a highly compressible and flexible drive member operatively connecting those of each pair, the pulley including a hub and a rim portion, the rim portion of the pulley being formed to provide thereabout, a series of pockets arranged to be entered by, and opening toward the drive member, said pockets being alternately of markedly differing depth, and certain of said pockets being provided with air-vent passages.

2. A power transmission pulley for use in pairs with a flexible drive member operatively connecting those of each pair, the pulley including a hub and a rim portion, the rim portion of the pulley being formed to provide thereabout, a series of pockets opening toward the drive member, alternate ones of said pockets being of markedly differing depth and width and those pockets of greater depth each having an air passage from its lower region.

3. A power transmission pulley for use in pairs with a compressively flexible drive member operatively connecting those of each pair, the pulley including a hub and a rim, the rim being formed to provide a continuous peripheral channel of substantially greater width than the normal unstressed width of the drive member, and a plurality of pockets each opening upwardly into the channel, each of the pockets being of a depth, at least equal to the length of its opening along the drive member, and an air-vent passage extending from the lower region of each of said pockets.

4. A power transmission pulley for use with a compressible and flexible drive member, the pulley including a rim provided with a peripheral channel, the channel being concave in cross sections through an axial plane, and a plurality of pockets opening upwardly into the channel, the pockets being substantially angularly spaced about the pulley, and each being of a section converging in area toward the axis of the pulley, each of said pockets being substantially closed but for a top opening to receive the drive member, and an air vent passage provided from its lower region.

5. A power transmission pulley for use with a compressible, flexible drive member operatively connecting a pair of the pulleys, the pulley including a hub for shaft mounting, and a rim portion, the rim portion including a continuous channel of arcuate cross section adapted to receive the driving member, the rim portion formed to present a series of spaced, relatively wide pockets and a plurality of spaced top-open wells, each of lesser width but of greater depth than the pockets and arranged between the pockets, each well opening into the channel, and each well being of a generally trapezoidal section in a radial plane including the axis of the pulley, and of a rounded uniformly concave section in a plane at a right angle to the aforesaid plane.

6. A power transmission pulley adapted for use in pairs with a compressively flexible drive member operatively connecting those of each pair, the pulley including a hub and an outer portion formed to provide a channel of substantial width or axial extent, characterized by spaced pockets of full channel width in their upper portions, said outer portion being further provided with a plurality of widely angularly spaced, top-open wells, opening at their tops into said channel, and substantially closed in their bottom regions, each well being of a lesser width at its top, but of greater depth than the pockets, the pockets and wells being alternately disposed about the outer portion of the pulley, each well being of a diminishing cross sectional area from top to bottom in a radial plane including the axis of the pulley, and of a rounded uniformly concave section in a plane at a right angle to the aforesaid plane.

7. A belt drive assembly including a pair of pulleys adapted for coaction with a belt of sponge-like stock operable adjacent the pulleys, at least one of the pulleys including a row of alternately dissimilar deeply recessed formations adapted sequentially to engage the belt, and certain of said formations each having an air-discharge passage from its innermost portion, said formations being alternately of differing width and depth to cause a cycle of expansion movements of said stock in different directions, as a given point of the belting moves about the pocketed pulley.

CHARLES I. PLACE.

REFERENCES CITED

The following references are of record in the file of this patent:

UNITED STATES PATENTS

| Number | Name | Date |
|---|---|---|
| 1,012,912 | Prather | Dec. 26, 1911 |
| 1,792,921 | Newhouse | Feb. 17, 1931 |
| 1,847,177 | Freedlander | Mar. 1, 1932 |
| 2,117,195 | McKerlie | May 10, 1938 |
| 2,176,335 | Gray | Oct. 7, 1939 |
| 2,397,312 | Forrest | Mar. 26, 1946 |